(12) United States Patent
Marquardt et al.

(10) Patent No.: US 10,456,947 B2
(45) Date of Patent: Oct. 29, 2019

(54) CLAMPING DEVICE FOR AN ADJUSTABLE STOP OF A PROCESSING MACHINE, PARTICULARLY A MOULDING MACHINE, AND PROCESSING MACHINE, PARTICULARLY MOULDING MACHINE, WITH A CLAMPING DEVICE

(71) Applicant: Michael Weinig AG, Tauberbischofsheim (DE)

(72) Inventors: Hermann Marquardt, Bad Mergentheim (DE); Walter Rapp, Königheim-Gissigheim (DE); Ralf Wagner, Hardheim (DE)

(73) Assignee: Michael Weinig AG, Tauberbischofsheim (DE)

( * ) Notice: Subject to any disclaimer, the term of this patent is extended or adjusted under 35 U.S.C. 154(b) by 121 days.

(21) Appl. No.: 14/924,761

(22) Filed: Oct. 28, 2015

(65) Prior Publication Data
US 2016/0121443 A1    May 5, 2016

(30) Foreign Application Priority Data
Nov. 4, 2014  (DE) .......................... 10 2014 016 631

(51) Int. Cl.
*B27C 1/12*   (2006.01)
*B27C 5/04*   (2006.01)
(Continued)

(52) U.S. Cl.
CPC ............... *B27C 1/12* (2013.01); *B23Q 1/285* (2013.01); *B23Q 1/58* (2013.01); *B27C 5/04* (2013.01); *B27C 5/06* (2013.01)

(58) Field of Classification Search
CPC .. B23Q 1/58; B23Q 1/285; B23Q 1/36; B27C 5/04; B27C 5/06; B27C 1/12
(Continued)

(56) References Cited

U.S. PATENT DOCUMENTS 1,412,225 A * 4/1922 Winkley ................ A43D 33/00
269/293
1,621,496 A * 3/1927 Crofoot .................. B25C 5/025
269/315
(Continued)

FOREIGN PATENT DOCUMENTS

AT          263335      7/1968
CA        2 444 371 A1  4/2004
(Continued)

*Primary Examiner* — Joseph J Hail
*Assistant Examiner* — J Stephen Taylor
(74) *Attorney, Agent, or Firm* — Gudrun E. Huckett (57) ABSTRACT

A clamping device for an adjustable stop of a processing machine for guiding workpieces through the processing machine is provided with at least one clamping part that clamps the stop against at least one counter stop. The clamping part is provided on a transmission element, wherein the transmission element is acted upon with a force ($F_1$) that is converted into a clamping force ($F_2$) acting upon the clamping part. A release unit is provided for releasing the clamping action. The transmission element is a two-armed lever, one arm of which is acted upon with the force ($F_1$) in the form of a compressive force and the other arm of which generates the clamping force ($F_2$).

19 Claims, 5 Drawing Sheets

(51) Int. Cl.
*B27C 5/06* (2006.01)
*B23Q 1/58* (2006.01)
*B23Q 1/28* (2006.01)

(58) Field of Classification Search
USPC ........................... 269/315; 144/134.1
See application file for complete search history.

(56) References Cited

U.S. PATENT DOCUMENTS

| | | | | |
|---|---|---|---|---|
| 1,867,922 A * | 7/1932 | Nelson | ................. | B23Q 16/001 |
| | | | | 269/315 |
| 1,960,884 A * | 5/1934 | Wilson | ................. | B23Q 3/06 |
| | | | | 269/315 |
| 1,980,502 A * | 11/1934 | Rouse | ................. | B23Q 3/16 |
| | | | | 227/131 |
| 2,080,563 A * | 5/1937 | Eskilson | ........... | B23K 37/0408 |
| | | | | 269/239 |
| 2,359,530 A * | 10/1944 | Rose | ................. | B23K 37/0408 |
| | | | | 219/161 |
| 2,572,137 A * | 10/1951 | Grieder | ................. | B23D 21/00 |
| | | | | 192/33 R |
| 2,675,836 A * | 4/1954 | Ellis | ................. | B27B 27/04 |
| | | | | 269/315 |
| 2,731,989 A * | 1/1956 | Valcourt et al. | ....... | B23Q 3/007 |
| | | | | 269/315 |
| 2,890,730 A * | 6/1959 | Gottlieb | ................. | B23B 39/161 |
| | | | | 144/150 |
| 2,985,205 A | 5/1961 | Mann et al. | | |
| 3,001,422 A * | 9/1961 | Klancnik | ................. | B23Q 7/106 |
| | | | | 269/156 |
| 3,174,747 A * | 3/1965 | Friedland | ................. | B21D 43/10 |
| | | | | 269/315 |
| 3,774,899 A * | 11/1973 | Mitchner | ................. | B23Q 3/00 |
| | | | | 269/315 |
| 3,826,119 A * | 7/1974 | Marotto | ................. | B21D 11/22 |
| | | | | 72/31.01 |
| 3,867,754 A * | 2/1975 | Koch | ................. | H01R 43/05 |
| | | | | 29/56.6 |
| 4,275,872 A * | 6/1981 | Mullis | ................. | B23Q 1/285 |
| | | | | 269/315 |
| 4,469,318 A * | 9/1984 | Slavic | ................. | B23Q 3/002 |
| | | | | 144/250.15 |
| 4,515,302 A * | 5/1985 | Davern | ................. | B21J 15/10 |
| | | | | 227/152 |
| 4,576,213 A * | 3/1986 | Miller | ................. | B23Q 1/621 |
| | | | | 144/134.1 |
| 4,645,112 A * | 2/1987 | Davern | ................. | B21J 15/10 |
| | | | | 221/248 |
| 4,796,682 A * | 1/1989 | Michaels | ............ | B23Q 9/0078 |
| | | | | 144/136.1 |
| 4,829,864 A * | 5/1989 | Yanagisawa | ........... | B21D 43/24 |
| | | | | 83/157 |
| 4,829,880 A * | 5/1989 | Lieberman | ................. | B23Q 1/58 |
| | | | | 92/110 |
| 4,836,522 A * | 6/1989 | Smith | ................. | B23Q 1/285 |
| | | | | 269/315 |
| 4,901,992 A * | 2/1990 | Dobeck | ................. | G05B 19/39 |
| | | | | 269/315 |
| 4,939,968 A * | 7/1990 | Stoof | ................. | B26D 7/015 |
| | | | | 269/303 |
| 4,986,323 A * | 1/1991 | Lemaire, Jr. | ............ | B27B 27/02 |
| | | | | 144/253.1 |
| 5,018,562 A * | 5/1991 | Adams | ................. | B27B 27/10 |
| | | | | 144/253.1 |
| 5,490,665 A * | 2/1996 | Thiele | ................. | B23D 59/001 |
| | | | | 269/303 |
| 5,579,672 A * | 12/1996 | Findlay | ................. | B23D 33/10 |
| | | | | 144/286.1 |
| 5,868,183 A * | 2/1999 | Kozyrski | ................. | A47G 1/10 |
| | | | | 144/136.1 |
| 5,890,524 A * | 4/1999 | Tucker | ................. | B23Q 1/28 |
| | | | | 144/135.2 |
| 6,026,870 A | 2/2000 | Liu | | |
| 6,029,967 A * | 2/2000 | Wolfe | ................. | B23Q 3/102 |
| | | | | 269/283 |
| 6,105,951 A * | 8/2000 | Shibata | ................. | B23Q 3/067 |
| | | | | 269/100 |
| 6,206,060 B1 * | 3/2001 | Blake | ................. | B23D 47/04 |
| | | | | 144/135.2 |
| 6,283,179 B1 * | 9/2001 | Liao | ................. | B27C 1/04 |
| | | | | 144/117.1 |
| 6,360,642 B1 * | 3/2002 | Miller | ................. | B27B 27/02 |
| | | | | 269/303 |
| 6,481,477 B1 * | 11/2002 | Szymanski | ............ | B23Q 3/007 |
| | | | | 144/135.2 |
| 6,622,997 B2 * | 9/2003 | Emerson | ................. | B25B 1/08 |
| | | | | 269/164 |
| 7,146,705 B2 * | 12/2006 | Ahti | ................. | B23Q 3/103 |
| | | | | 269/297 |
| 7,163,364 B2 * | 1/2007 | Foscan | ................. | B23C 3/355 |
| | | | | 269/303 |
| 7,228,774 B2 * | 6/2007 | Stolzer | ................. | B23D 47/04 |
| | | | | 269/304 |
| 7,341,081 B1 | 3/2008 | Villiger | | |
| 8,132,309 B1 * | 3/2012 | Bronson | ................. | B25B 1/103 |
| | | | | 269/6 |
| 8,585,029 B2 * | 11/2013 | Ryai, Sr. | ................. | B23C 3/355 |
| | | | | 269/257 |
| 2004/0065387 A1 * | 4/2004 | Smith | ................. | B23Q 3/007 |
| | | | | 144/253.1 |
| 2006/0201297 A1 * | 9/2006 | Friend | ................. | B27B 25/02 |
| | | | | 83/436.1 |
| 2010/0307302 A1 * | 12/2010 | Smith | ................. | B23D 47/04 |
| | | | | 83/13 |
| 2012/0248675 A1 * | 10/2012 | Harder | ................. | B23Q 16/001 |
| | | | | 269/315 |
| 2013/0032985 A1 * | 2/2013 | Douglas | ................. | B25H 1/10 |
| | | | | 269/315 |
| 2014/0041494 A1 * | 2/2014 | Kelly | ................. | B27B 27/08 |
| | | | | 83/13 |
| 2016/0121510 A1 * | 5/2016 | Gramlich | ................. | B27C 1/12 |
| | | | | 144/250.13 |

FOREIGN PATENT DOCUMENTS

| | | | |
|---|---|---|---|
| DE | 34 21 430 | 12/1985 | |
| DE | 10 2006 019 115 A1 | 11/2006 | |
| EP | 1281491 A2 * | 2/2003 | ............ B27C 1/12 |
| GB | 572 322 | 10/1945 | |
| JP | 2003127107 | 5/2003 | |

* cited by examiner

CLAMPING DEVICE FOR AN ADJUSTABLE STOP OF A PROCESSING MACHINE, PARTICULARLY A MOULDING MACHINE, AND PROCESSING MACHINE, PARTICULARLY MOULDING MACHINE, WITH A CLAMPING DEVICE

BACKGROUND OF THE INVENTION

The invention pertains to a clamping device for an adjustable stop of a processing machine, particularly a moulding machine, for guiding workpieces through the processing machine, with at least one clamping part by means of which the stop can be clamped against at least one counter stop.

The invention pertains also to a processing machine, particularly a moulding machine, comprising such a clamping device.

In processing machines, particularly moulding machines, it is known to guide the workpieces for working along working tools. During this process, the workpieces rest against a stop. This stop must be precisely positioned relative to the cutting circle diameter of the assigned tool in order to ensure that the workpiece is exactly guided through the processing machine. Correctly adjusted stops are one of the decisive factors for the quality of the workpieces being processed. The stop is mechanically clamped in the processing machine by means of screws. The tools must be frequently changed depending on the type of processing to be carried out on the workpiece. Since the tools often have different cutting circle diameters and moulding depths, it is necessary to adjust the stop with respect to the different cutting circle diameters of the tools. In order to carry out such an adjustment, it is necessary to loosen the screws that can only be difficulty accessed from the rear side of the stop and sometimes require a change of the machine adjustment or the removal of other machine components. Due to the difficult access, a potential risk of injuries to the machine operator also cannot be excluded.

The invention is based on the object of designing the clamping device and the processing machine of the initially cited type in such a way that the stop can be clamped in a constructively simple fashion, wherein the clamping can also be easily and safely released as required.

SUMMARY OF THE INVENTION

According to the invention, this object is solved for a clamping device of the aforementioned kind in that the clamping part is provided on a transmission element, wherein the transmission element is acted upon with a force ($F_1$) that is converted into a clamping force ($F_2$) acting upon the clamping part, and in that a release unit is provided for releasing the clamping action.

The object is further solved for a processing machine of the aforementioned kind in that it comprises a clamping device as set forth above.

The inventive clamping has the transmission element, by means of which the clamping part can be actuated. The transmission element is acted upon with a force that is converted by the transmission element in such a way that a clamping force acts upon the clamping part. The clamping force acting upon the clamping part therefore can be generated in a purely mechanical fashion. The clamping is released by means of a release unit.

The transmission element advantageously is a two-armed lever, one arm of which is subjected to the force in the form of a compressive force and the other arm of which generates the clamping force. In this case, the clamping force is directed opposite to the compressive force. The two-armed lever is a constructively simple component that can generate a high clamping force when it is subjected to a low compressive force due to the lever action.

In an advantageous embodiment, the force is generated by at least one pressure spring that is arranged on an axis fastened in the counter stop. The pressure spring is a cost-effective component that can be easily installed and also removed as required. The pressure spring particularly is also a safe and reliable component after a prolonged period of use.

The clamping part is advantageously seated on one end of a ram that penetrates the corresponding arm of the lever and the counter stop. This ram extends transverse to the adjusting direction of the stop.

The counter stop advantageously is arranged between the stop and the transmission element.

In order to enable the ram to actuate the clamping part, the axis, on which the pressure spring is arranged, and the ram penetrate the transmission element with a certain clearance. The axis and the ram advantageously extend parallel to one another and therefore perpendicular to the adjusting direction of the stop. The corresponding openings in the transmission element have a larger diameter than the axis and the ram such that the transmission element can be easily adjusted relative to the ram and the axis.

In a preferred embodiment, the ram is provided with a counter bearing on the end facing away from the clamping part. The ram is supported on the outer side of the transmission element facing away from the counter stop by means of said counter bearing. The counter bearing and the clamping part therefore lie on different sides of the counter stop, against which the stop is clamped after its adjustment.

Effective clamping is achieved if the clamping part is a sliding block that lies in a T-groove in the stop. Since the T-groove extends in the adjusting direction of the stop, the stop can be easily displaced in the adjusting direction such that it is spaced apart from the cutting circle diameter of the associated tool by the required distance. The adjusting direction of the stop extends parallel to the transport direction, in which the workpieces to be processed are transported through the processing machine.

In the clamping position, the clamping part advantageously pulls the stop against the counter stop under the influence of the clamping force.

In an advantageous embodiment, the counter bearing features a conical socket and a taper disc cooperating therewith. In this way, the transmission element can be pivoted relative to the ram when the clamping is released and, vice versa, when the clamping force should be generated. The conical socket and the taper disc form a ball-and-socket joint of sorts, by means of which it is ensured that the ram can always be acted upon and adjusted in the direction of its longitudinal axis despite an inclined position of the transmission element.

In order to achieve a high clamping force despite the low force acting upon the transmission element, it is advantageously proposed that the distance between the axis carrying the pressure spring and the pivoting axis of the transmission element is greater than the distance between the ram with the clamping part and the pivoting axis. The pivoting axis of the transmission element extends perpendicular to the adjusting direction of the stop and to the transport direction of the workpieces through the processing machine.

The transmission element is advantageously actuated by the release unit, in particular, when the clamping of the stop should be released.

In order to ensure that the release unit only has to generate a low force for releasing the clamping, it advantageously engages on the end of the transmission element facing away from the ram.

A pneumatic cylinder, as well as a hydraulic cylinder, an electric or an electromagnetic drive, may be used as release unit.

The release unit is advantageously actuated with a switch. It is arranged on the moulding machine in such a way that it can be comfortably actuated by the operator, wherein said switch is advantageously located outside the region of the tools and the transport devices of the processing machine, but spatially allocated to the stop to be adjusted. In this way, the release unit can be easily yet reliably actuated by the operator with the aid of the switch. Operating errors are thereby prevented.

The inventive processing machine with the clamping device makes it possible to very quickly adjust the stop with respect to the cutting circle diameter and the moulding depth of the corresponding tool. The clamping force is generated by tensioning the mechanical pressure spring whereas the clamping force is relieved by pivoting the transmission element against the force of the pressure spring by means of a release unit. The pressure spring ensures that the stop is continuously clamped in position as long as the release unit has not been actuated.

The adjustable stop is advantageously assigned to a right tool of the processing machine. In a moulding machine, in particular, this right tool machines the right longitudinal side of a workpiece referred to the transport direction while it passes through the processing machine. The adjustable stop is located behind the right tool referred to the transport direction of the workpieces through the processing machine.

The invention is not only defined by the subject matter of the individual claims, but also by all information and features disclosed in the drawings and the description. Even if they are not subject matter of the claims, they are claimed as being essential to the invention insofar as they are novel in comparison with the prior art individually or in combination.

Other features of the invention result from the other claims, the description and the drawings.

BRIEF DESCRIPTION OF THE DRAWINGS

The invention is described in greater detail below with reference to an exemplary embodiment that is illustrated in the drawings.

DESCRIPTION OF PREFERRED EMBODIMENTS

Figure 1:
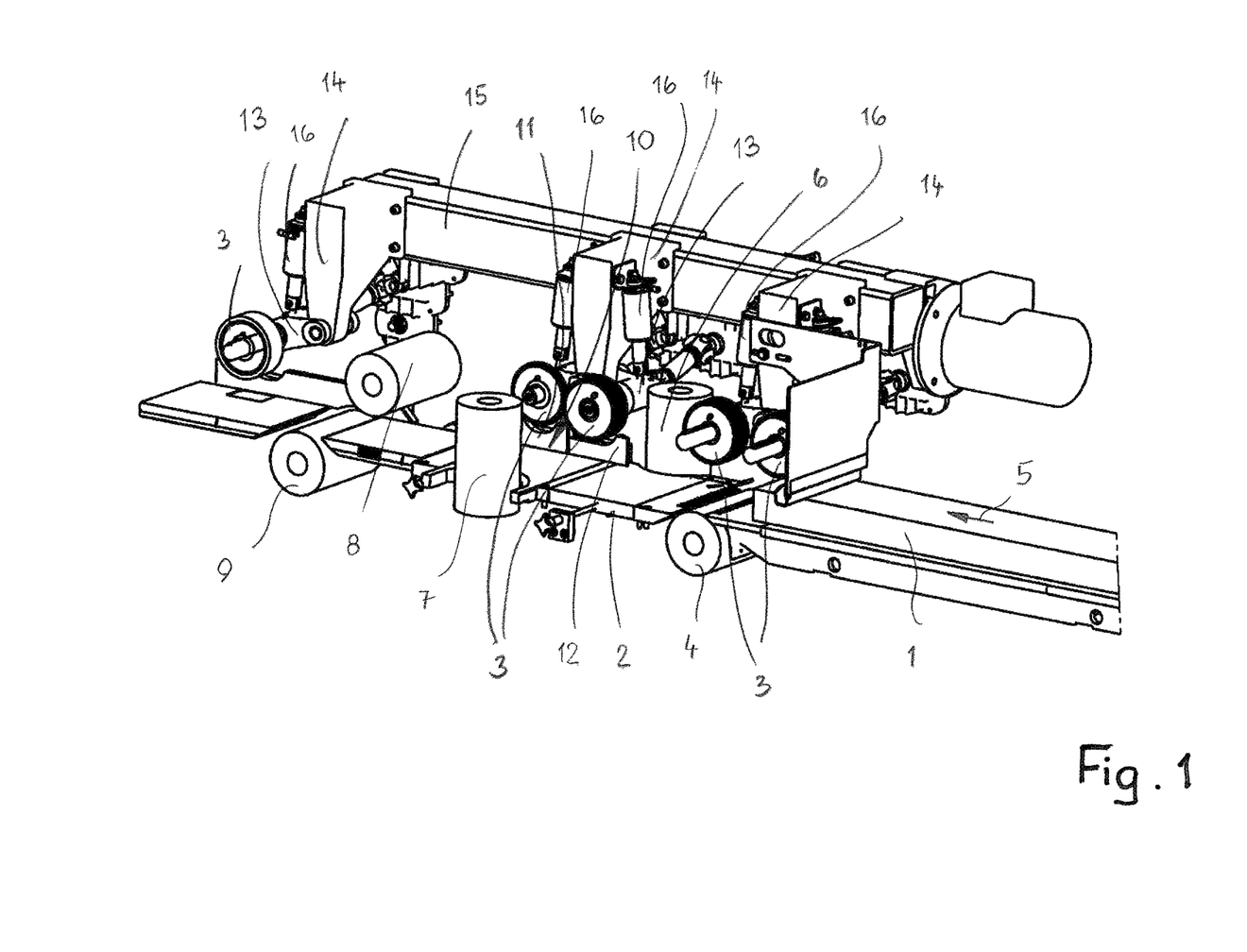
FIG. 1 shows an inventive processing machine in the form of a perspective view.

In the exemplary embodiment, the processing machine advantageously is a moulding machine, by means of which workpieces can be processed on four sides while they pass through the moulding machine. The workpieces to be processed are fed to a machine table 2 of the moulding machine by means of an infeed table 1. The workpieces are transported through the moulding machine on this machine table by means of transport rollers 3. The moulding machine has a lower tool 4, which is rotatable about a horizontal axis and processes the underside of the workpiece while it passes through the moulding machine. A right tool 6 is arranged in the moulding machine behind the tool 4 referred to the transport direction 5, wherein this right tool is rotatable about a vertical axis and processes the right longitudinal side of the workpiece referred to the transport direction 5 while it passes through the moulding machine. The other longitudinal side of the workpiece is processed by a left tool 7 that is rotatable about a vertical axis. The two vertical tools 6, 7 are arranged offset to one another referred to the transport direction 5 of the workpiece. An upper tool 8, which is rotatable about a horizontal axis and processes the upper side of the workpiece while it passes through the moulding machine, is located behind the left tool 7 referred to the transport direction 5.

The moulding machine is furthermore provided with a lower tool 9 that is arranged behind the upper tool 8 referred to the transport direction 5, wherein this lower tool is also rotatable about a horizontal axis and once again processes the underside of the workpiece. The moulding machine may have additional right, left, upper or lower spindles depending on the respective application. The workpiece rests against stops (fences) 10 with its right longitudinal side referred to the transport direction 5 while it passes through the moulding machine.

These stops (fences) consist of a rigidly arranged stop (fence) 11 that lies opposite of the left tool 7 and a stop (fence) 12 that is located behind the right tool 6 referred to the transport direction 5 and can be adjusted (adjustable fence) relative to the circle diameter of this right tool 6 in the transport direction 5 as required.

The transport rollers 3 are connected to swing holders 14, which are fastened on a transport beam 15, by means of feed rockers 13. The transport beam extends in the transport direction 5 in the region above the machine table 2. When workpieces should be transported through the moulding machine, the transport rollers 3 are pressed against the workpieces with the aid of pressure cylinders 16 that are supported on the swing holders 14 and engage on the feed rockers 13.

The position of the stop 12 depends on the cutting circle diameter and the moulding depth of the right tool 6. When a tool with a different cutting circle diameter is inserted or when the distance between the stop 12 and the cutting circle diameter changes as a result of the position of the tool 6 transverse to the transport direction 5 of the workpiece and to the stop 12 due to profiling with a corresponding moulding depth, the stop 12 has to be readjusted relative to this tool in the transport direction 3. During a straight planing operation, the circle diameter is directly aligned with the stop after the right spindle 6. The adjustment of the stop 12 is limited to a relatively short distance when the cutting circle diameter of the tool changes. When the workpiece is profiled on the right side, which is partially realized with the first right spindle 6 or the so-called jointing spindle, but primarily with the 2. right spindle, the moulding depth of the cutting edges protrudes over the stop 12. In this case, the position of the stop 12 not only depends on the cutting circle diameter of the tool, but also on the dimension, by which the cutting edges protrude and which corresponds to the moulding depth (profiling depth). An adjustment of the stop 12 is therefore required, in particular, when changing from a straight planing operation to a profiling operation. The adjusting direction of the stop 12 extending parallel to the transport direction 5 is indicated by the double arrow 17 in FIG. 2. In the working position, the stop 12 is clamped in position such that it cannot be inadvertently adjusted relative to the tool 6. This is realized with a clamping device 18 that is described in greater detail below with reference to the following figures.

Figure 2:
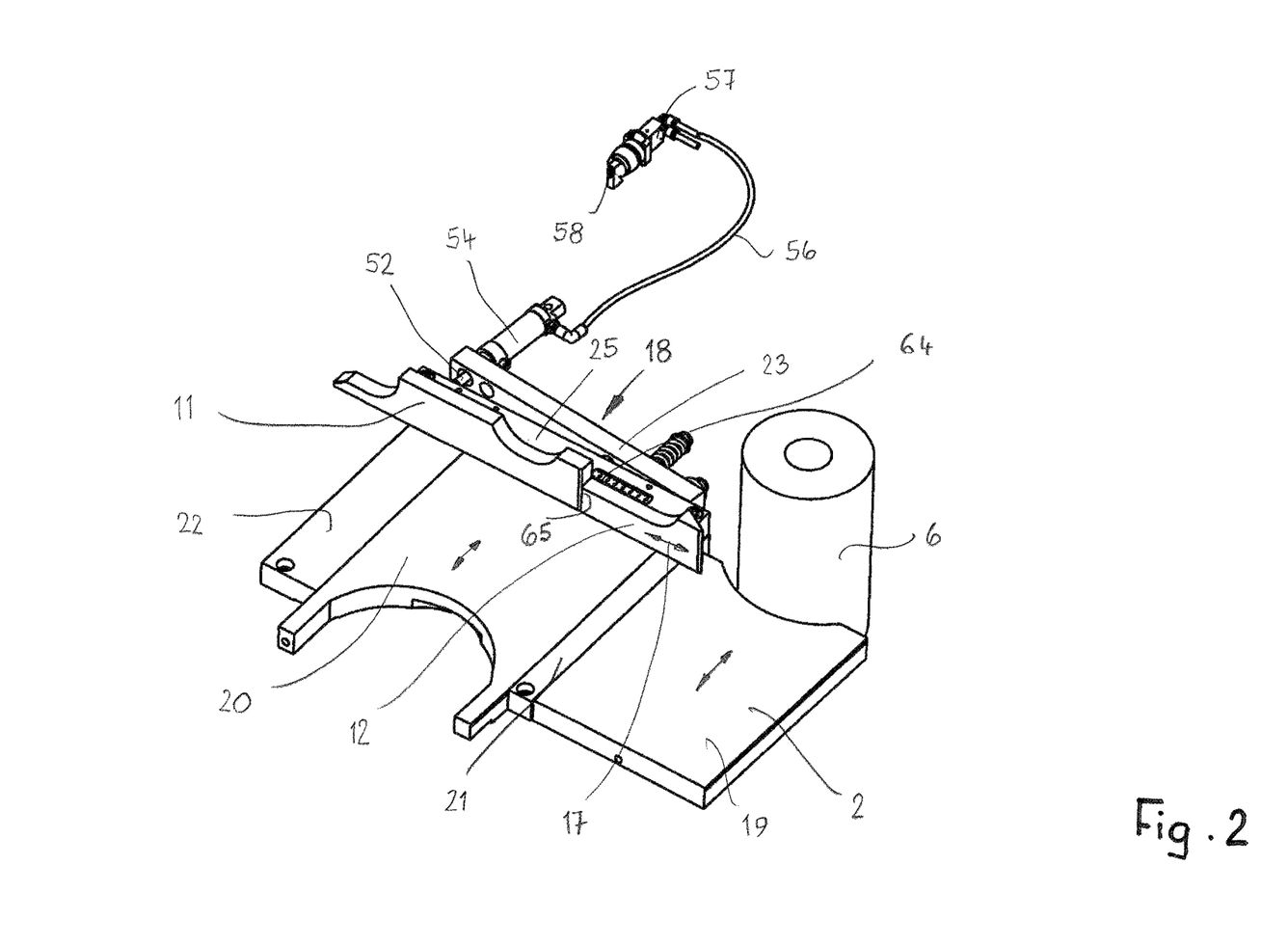
FIG. 2 shows a perspective view of an inventive clamping device for a stop of the inventive processing machine.

FIG. 2 shows two table panels 19, 20 that are respectively assigned to the right tool 6 and the left tool 7 (FIG. 1) and can be adjusted relative to the corresponding tool 6, 7 perpendicular to the transport direction 5. A guide rail 21 is arranged rigidly referred to the machine between the two table panels 19, 20, wherein the table panels 19, 20 are guided on said guide rail with their longitudinal sides that face one another. The guide rail 21 is advantageously screwed on the (not-shown) machine stand.

On its opposite longitudinal side, the table panel 20 is during the adjustment guided transverse to the transport direction 5 on another guide rail 22 that is arranged rigidly referred to the machine. A guide rail or another table panel is also arranged in front of the table panel 19 referred to the transport direction 5.

The adjustable stop 12 is clamped in the working position (FIG. 3) by means of the clamping device 18. It has a lever 23 that can be respectively pivoted or tilted about a vertical axis 24. The axis 24 is advantageously formed by a cylindrical pin that is arranged between the lever 23 and a stop carrier 25. It is advantageously placed into a respective downwardly and upwardly confined groove in the lever 23 and in the stop carrier 25 such that it cannot fall out after the installation. The stops 11, 12 are flatly placed against the stop carrier 25 with their rear sides 26, 27 that face away from the left tool 7. The stops 11, 12 respectively extend perpendicular to the machine table 2 and the table panels 19, 20. The stop carrier 25 has an approximately square cross section and is advantageously lower than the stops 11, 12.

Figure 6:
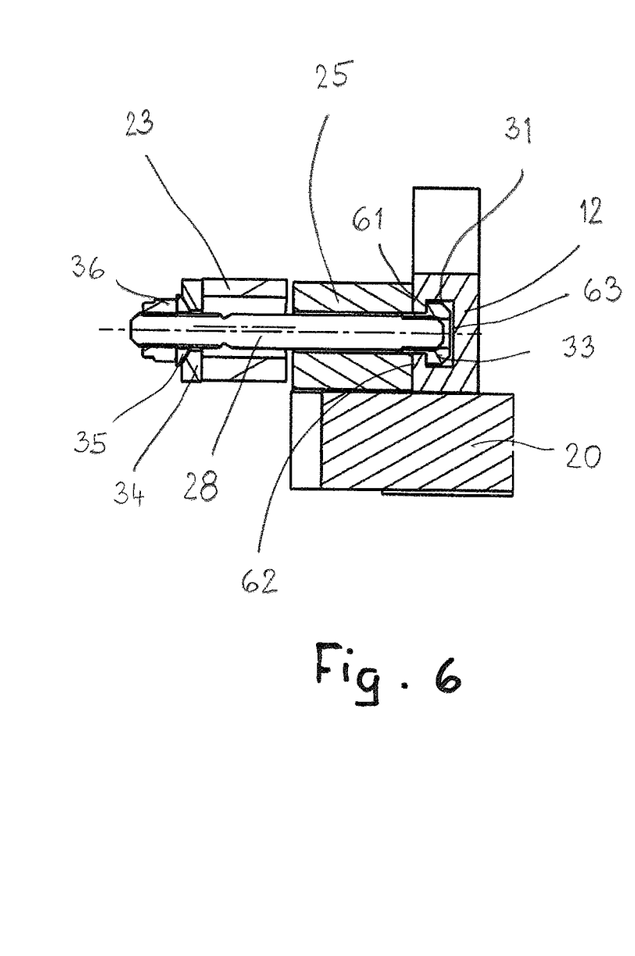
FIG. 6 shows an enlarged section along the line B-B in FIG. 3.

The axis 24 is located in the region of the adjustable stop 12 near its end. In this end region, the lever 23 is penetrated by a stud bolt 28 with a certain clearance. This clearance is dimensioned so large that the lever 23 can be pivoted relative to the stop carrier 25 (FIG. 4). The stud bolt 28 also penetrates the stop carrier 25, which is provided with a corresponding through-opening 30 for this purpose. Its diameter is slightly larger than the diameter of the stud bolt 28 such that the stud bolt 28 easily can be axially displaced therein. It protrudes into a T-groove 31 (FIGS. 3 and 6) provided in the rear side 27 of the displaceable stop 12. The T-groove extends from the side resting against the stop 11 close to the opposite end face 32 of the stop 12. A sliding block 33, which is held in the T-groove and can be displaced relative to the stop 12 in the adjusting direction 17, is seated on the end of the stud bolt 28 that protrudes into the T-groove.

Figure 5:
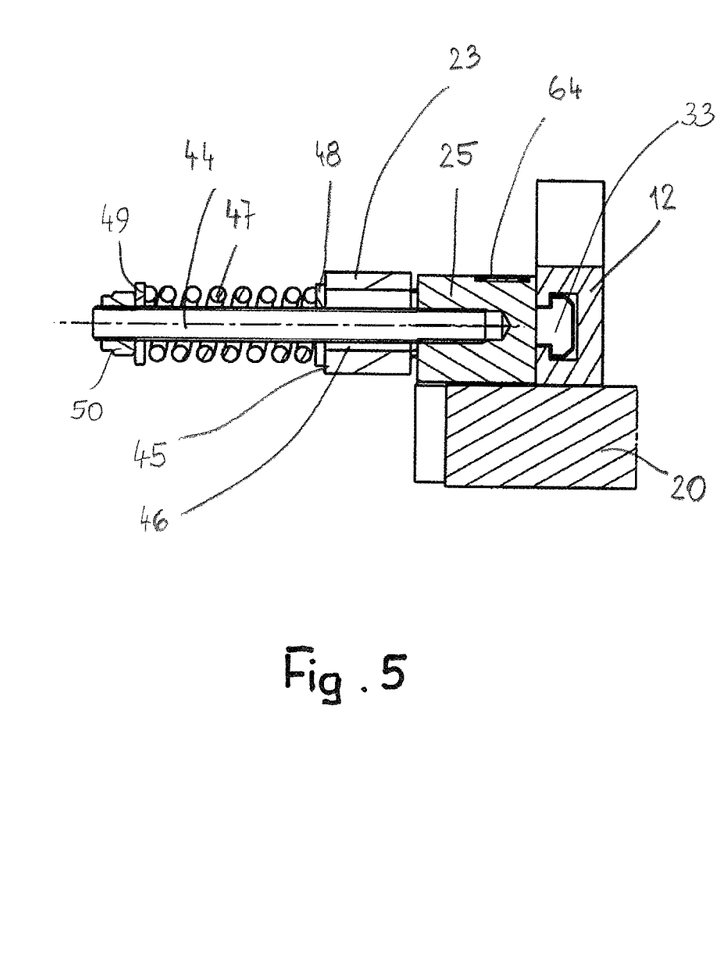
FIG. 5 shows an enlarged section along the line A-A in FIG. 3.

A conical socket 34 is seated on the other end of the stud bolt 28 that protrudes over the lever 23, wherein a taper disc 35 engages into said conical socket (FIG. 5). It is held in contact with the conical socket 34 by means of a nut 36 that is screwed on the free end of the stud bolt 28 and preferably realized in a self-locking fashion. Due to this arrangement, surface contact is always ensured regardless of the pivoting or tilting motion of the lever 23. The conical socket 23 also has a sufficiently large diameter referred to the stud bolt 23 such that the conical socket 34 and the stud bolt 23 do not get stuck on one another during the pivoting motion of the lever 23 and the conical socket 34 resting against said lever.

Figure 3:
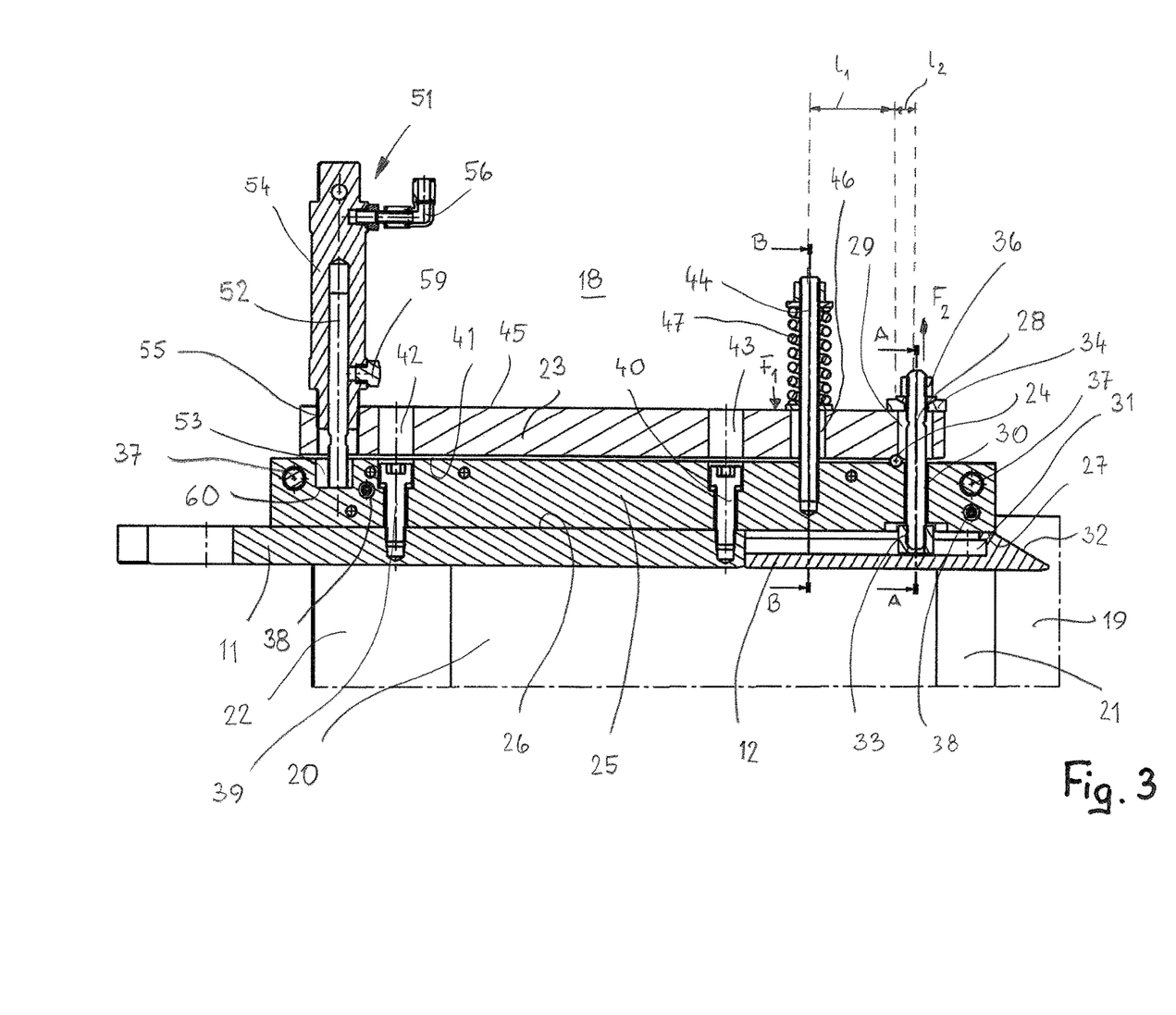
FIG. 3 shows an enlarged section through the clamping device according to FIG. 2, in which the stop is in the clamped position.
Figure 4:
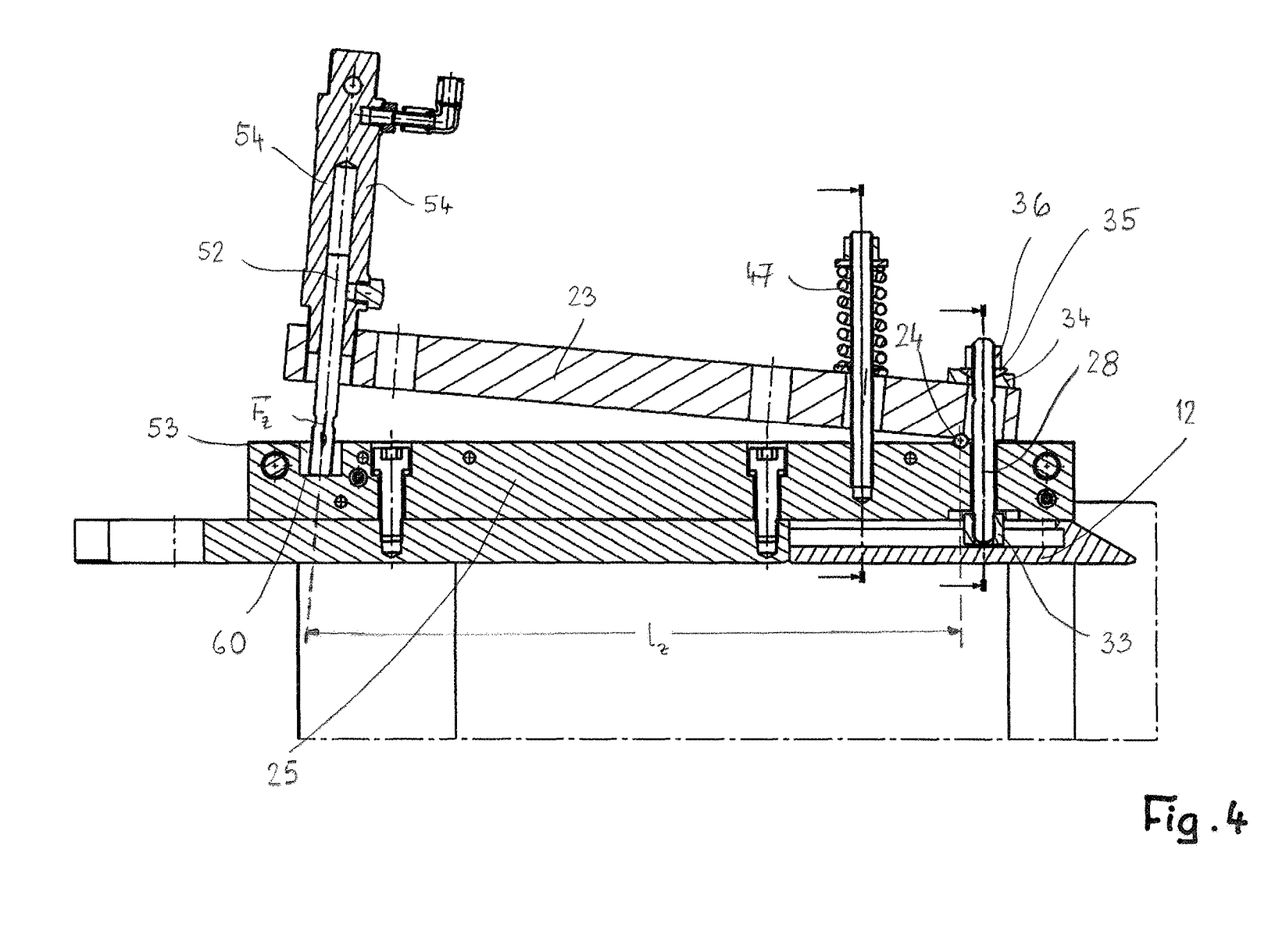
FIG. 4 shows in a view corresponding to FIG. 3, the stop in the released position.

The stop carrier 25 is respectively screwed and pinned on the guide rail 21 and the machine stand by means of screws 37 and pins 38 (FIG. 3). The fixed stop 11 is fastened on the stop carrier 25 by means of screws 39, 40. The screws 39, 40 are screwed into the rear side 26 of the fixed stop 11. The screw heads are advantageously countersunk in the rear side 41 of the stop carrier 25 that faces away from the stop 11. The stop 11 can be reliably fastened on the stop carrier 25, against which it flatly rests, with the aid of the screws 39, 40. At the height of the screws 39, 40, the lever 23 is provided with through-openings 42, 43, into which a tool for actuating the screws 39, 40 can be inserted.

A threaded rod 44 is screwed into the rear side 41 of the stop carrier 25 and protrudes over the rear side 45 of the lever 23 that faces away from the stop carrier 25. The opening 46 in the lever 23, through which the threaded rod 44 protrudes, has a larger diameter than the threaded rod 44. In this way, the lever 23 can be respectively tilted or pivoted about the axis 24 as described in greater detail further below. The section of the threaded rod 44 protruding over the lever 23 is surrounded by a pressure spring 47 (FIG. 5), one end of which is supported on the rear side 45 of the lever 23 by means of a disc 48. The other end of the pressure spring 37 rests against a disc 49 that surrounds the threaded rod 44 and is supported on a nut 50 screwed on the free end of the threaded rod 44. The nut 50 is preferably realized in a self-locking fashion. The nut 50 serves for adjusting the pretension of the pressure spring 47. In the clamping position illustrated in FIG. 3, the pressure spring 47 exerts the force $F_1$ upon the lever 23 (FIG. 3).

According to FIG. 3, the threaded rod 44 and the stud bolt 28 lie on opposite sides of the axis 24. The axis of the threaded rod 44 is spaced apart from the axis 24 by the distance $I_1$ and the axis of the stud bolt 28 is spaced apart from said axis by the distance $I_2$. In this case, the distance is greater than the distance $I_2$.

In the clamping position illustrated in FIG. 3, the lever 23 exerts the force $F_2$ upon the stud bolt 28 by means of the conical socket 34, the taper disc 35 and the nut 36. It is directed opposite to the force $F_1$ because the stud bolt 28 and the threaded rod 44 with the pressure spring 47 are arranged on opposite sides of the axis 24.

A release unit 51 has a piston rod 52 that engages with its free end into a recess 53 provided in the rear side 41 of the stop carrier 25. It is arranged near the end of the stop carrier 25 that lies opposite of the stud bolt 28, as well as the threaded rod 44. The piston rod 52 forms part of a pneumatic cylinder 54 that is rigidly connected to the lever 23. The pneumatic cylinder 54 is preferably screwed into a threaded bore 55 of the lever 23. A pneumatic line 56 is connected to the pneumatic cylinder 54. According to FIG. 2, the pneumatic line 56 connects the pneumatic cylinder 54 to a pneumatic valve 57 that can be actuated with a switch 58. The switch 58 is arranged on the moulding machine in such a way that it can be comfortably actuated by the operator. On the piston side that lies opposite of the connection to the pneumatic line 56, the pneumatic cylinder 54 is provided with an outlet 59, through which air can respectively escape from the piston rod side during the extension of the pneumatic cylinder 58 and flow in during the retraction thereof. The outlet 59 is advantageously provided with a sound absorber.

The pneumatic cylinder used may also consist of a pneumatic cylinder that can be loaded in both directions.

In the clamping position according to FIG. 3, the pneumatic cylinder 54 is retracted such that the piston rod 52 only protrudes slightly over the pneumatic cylinder 54. In the illustration according to FIG. 3, the force of the pressure spring 47 acts upon the lever 23 counterclockwise in the direction of the stop carrier 25. The piston rod 52 rests against the bottom 60 of the recess 53. Since the stud bolt 28 is located on the side of the axis 24 facing away from the threaded rod 44, the stud bolt 28 is respectively pushed or acted upon outward by the lever 23. As a result, the sliding block 33 is firmly pressed against the wall 61 (FIG. 6) of the T-groove 31 that faces the stop carrier 25. In this way, the stop 12 is pressed against the front side 62 of the stop carrier 25 with great force and therefore locked.

The stop 12 therefore is exclusively clamped in position with the force of the pressure spring 47. In the clamping position, the correlation $F_1 \times I_1 = F_2 \times I_2$ applies. This results in $F_2 = F_1 \times I_1 / I_2$. With consideration of the fact that the distance $I_1$ is greater than the distance $I_2$, the resulting force $F_2$, with which the stud bolt 28 pulls the sliding block 33 against the wall 61 of the T-groove 31, is greater than the force $F_1$ exerted upon the lever 23 by the pressure spring 47.

The force $F_2$ can be adjusted correspondingly high by choosing the distance ratio accordingly.

The force $F_Z$ (FIG. 4) exerted by the pneumatic cylinder 54 is relatively low. The correlation $F_Z \times I_Z = F_1 \times I_1$ results in $F_Z = F_1 \times I_1 / I_Z$. Since the lever arm $I_Z$ (corresponding to the distance between the axis 24 and the axis of the piston rod 52) is significantly longer than the lever arm the resulting force $F_Z$ is significantly lower than the force $F_1$. As mentioned above, the force $F_1$ exerted upon the lever 23 by the pressure spring 47 is significantly lower than the clamping force $F_2$ exerted by the stud bolt 28 such that the clamping with the required high clamping force can be released with a relatively low release force.

If the stop 12 should be adjusted in the adjusting direction 17, the pneumatic cylinder 54 is extended (FIG. 4) by actuating the switch 58. The piston rod 52 always rests on the bottom 60 of the recess 53 of the stop carrier 25. This is ensured by the pressure spring 47 that continuously acts upon the lever 23 in the counterclockwise pivoting direction. Since the pneumatic cylinder 54 is rigidly connected to the lever 23, the lever 23 is now pivoted about the axis 24 in the clockwise direction. The stud bolt 28 therefore is relieved of the force $F_2$ and can be displaced in the direction of the bottom 63 of the T-groove 31 together with the sliding block 33. The clamping of the stop 12 is thereby released such that the required clearance between the stop 12 and the stop carrier 25, as well as between the sliding block 33 and the T-groove 31, is adjusted and the stop 12 can now be displaced into the new position relative to the stop carrier 25 in the adjusting direction 17. Once the desired position of the stop 12 is reached, the valve 57 is changed over by means of the switch 58 such that the pneumatic cylinder 54 once again moves back into the initial position illustrated in FIG. 3. This is achieved in that the lever 23 is pivoted back under the influence of the pressure spring 47 such that the piston rod 52 of the pneumatic cylinder 54 is retracted. During this process, the pneumatic medium in the pneumatic cylinder 54 can escape through the pneumatic line 56 and the valve 57. The sliding block 33 is once again pulled against the wall 61 of the T-groove 31 with great force by the stud bolt 28 that is supported on the lever 23 in the above-described fashion. The stop 12 is then firmly clamped on the stop carrier 25.

The stop 12 is mechanically clamped in the described fashion in that a lever transmission converts the force $F_2$ exerted by the pressure spring 47 into a high clamping force acting upon the adjustable stop 12. The release unit 51 with the pneumatic cylinder 54 merely serves for releasing the clamping by pivoting the lever 23 against the force of the pressure spring 47. As a result, the stud bolt 28 is now displaced into the release position together with the sliding block 33 such that the clamping of the stop 12 is released. The stop 12 can now be adjusted into the desired position relative to the tool 6 in the transport direction 5 or in the adjusting direction 17, respectively. In order to allow an exact adjustment, a scale 64 is provided on the stop carrier 25, wherein an end face 65 of the stop 12 that faces the fixed stop 11 is assigned to said scale.

The operator can easily release the clamping of the stop 12 by means of the switch 58. The pressure spring 47 ensures a reliable pretension of the stop 12. A high operating comfort is achieved because the operator merely has to actuate the switch 58. Operating errors, in particular, are thereby prevented. No additional tools are required for releasing the stop 12 at locations that are difficult to access, wherein said tools are also frequently misplaced and therefore not readily available in practical applications. Since the stop 12 can be easily adapted to the cutting circle diameter of the tool 6, high processing quality of the workpieces is simultaneously ensured.

Instead of using a pneumatic drive, the clamping can also be released with any other suitable drives such as a hydraulic drive, an electric or an electromagnetic drive.

In the described exemplary embodiment, the lever 23 is a two-armed lever. This is the reason why the compressive force $F_1$ and the clamping force $F_2$ are directed opposite to one another. However, the lever 23 may also be realized in the form of a one-armed lever. In this case, the axis 24 lies on the side of the stud bolt 28 facing away from the threaded rod 44. The distances and $I_2$ also differ in this case, wherein the distance is once again greater than the distance $I_2$. The force $F_1$ and the clamping force $F_2$ act in the same direction in such a lever design. In such a design, the clamping force $F_2$ would be exerted when the lever 23 is pivoted in the clockwise direction, i.e. the force $F_1$ must act opposite to the direction in the above-described exemplary embodiment. In this case, the release unit 51 must pivot the lever 23 in the counterclockwise direction in order to release the clamping.

The force $F_1$ may be respectively exerted upon the lever 23 in the form of a compressive force, as well as in the form of a tensile force.

The specification incorporates by reference the entire disclosure of German priority document 10 2014 016 631.7 having a filing date of Nov. 4, 2014.

While specific embodiments of the invention have been shown and described in detail to illustrate the inventive principles, it will be understood that the invention may be embodied otherwise without departing from such principles.

What is claimed is:

1. A clamping device for an adjustable fence of a moulding machine, wherein the adjustable fence (12) comprises a first side facing workpieces and configured to laterally guide, in a fixed working position of the adjustable fence (12) on the moulding machine, the workpieces as the workpieces move along the adjustable fence (12) through the moulding machine in a transport direction, wherein the adjustable fence (12) further comprises a second side facing away from the workpieces, wherein at least one counter stop (25), comprising a first face and an opposite second face facing away from the first face, is arranged at the second side of the adjustable fence (12) so that the first face is facing the second side of the adjustable fence; the clamping device comprising:

a transmission element (23) arranged at the second face of the at least one counter stop (25);

at least one clamping part (33) arranged at the transmission element (23);

wherein a force-applying element (47) acts mechanically permanently on the transmission element (23) with a force ($F_1$) that is converted by the transmission element (23) into a clamping force ($F_2$) acting upon the clamping part (33) so that the clamping part provides a clamping action fixedly clamping the adjustable fence (12) against the at least one counter stop (25) in the fixed working position;

a drive (52, 54) supported at the at least one counter stop (25) and operatively connected to the transmission element (23), wherein the drive (52, 54), when actuated, moves the transmission element (23) against the force ($F_1$) of the force-applying element (47) to release the clamping action.

2. The clamping device according to claim 1, wherein the transmission element (23) is a two-armed lever, one arm of which is acted upon with the force ($F_1$) that is a compressive force and the other arm of which generates the clamping force ($F_2$).

3. The clamping device according to claim 2, wherein the force-applying element is at least one pressure spring (47) generating the compressive force ($F_1$) and wherein the at least one pressure spring (47) is arranged on an axis (44) fastened in the counter stop (25).

4. The clamping device according to claim 1, wherein the drive (52, 54) is actuated with a switch (58).

5. The clamping device according to claim 1, wherein the drive (52, 54) is supplied with energy.

6. The clamping device according to claim 5, wherein the drive (52, 54) is actuated pneumatically, hydraulically, electrically or electromagnetically.

7. A clamping device according to claim 1, wherein the clamping force is permanently acting on the clamping part (33) and is releasable only by actuating the drive (52, 54).

8. A clamping device for an adjustable fence of a moulding machine, wherein the adjustable fence (12) comprises a first side facing workpieces and configured to laterally guide, in a fixed working position of the adjustable fence (12) on the moulding machine, the workpieces as the workpieces move along the adjustable fence (12) through the moulding machine in a transport direction, wherein the adjustable fence (12) further comprises a second side facing away from the workpieces, wherein at least one counter stop (25), comprising a first face and an opposite second face facing away from the first face, is arranged at the second side of the adjustable fence (12) so that the first face is facing the second side of the adjustable fence (12); the clamping device comprising:

a transmission element arranged at the second face of the at least one counter stop (25) opposite the adjustable fence (12);

at least one clamping part (33) arranged at the transmission element;

wherein the transmission element is acted upon by a force-applying element with a force ($F_1$) that is converted by the transmission element into a clamping force ($F_2$) acting upon the clamping part (33) so that the clamping part provides a clamping action fixedly clamping the adjustable fence against the at least one counter stop (25) in the fixed working position;

a release unit (51), comprising a cylinder (54) and a piston rod (52) movably disposed in the cylinder (54), wherein the piston rod (52) is connected to the at least one counter stop (25) and the cylinder (54) is connected to the transmission element, wherein the release unit (51), when actuated, moves the transmission element against the force ($F_1$) of the force-applying element (47) to release the clamping action;

wherein the transmission element (23) is a two-armed lever, one arm of which is acted upon with the force ($F_1$) that is a compressive force and the other arm of which generates the clamping force ($F_2$), wherein the other arm of the lever (23) and the counter stop (25) are penetrated by a ram (28), wherein the ram (28) comprises an end that is provided with the clamping part (33).

9. The clamping device according to claim 8, wherein the counter stop (25) is arranged between the adjustable fence (12) and the transmission element (23).

10. The clamping device according to claim 9, wherein the force-applying element is at least one pressure spring (47) generating the compressive force ($F_1$) and wherein the at least one pressure spring (47) is arranged on an axis (44) fastened in the counter stop (25), wherein the axis (44) and the ram (28) penetrate the transmission element (23) with a certain clearance.

11. The clamping device according to claim 8, wherein the ram (28) is provided, on the end facing away from the clamping part (33), with a counter bearing (34 to 36) that is supported on the outer side (45) of the transmission element (23) facing away from the counter stop (25).

12. The clamping device according to claim 11, wherein the clamping part (33) pulls the adjustable fence (12) against the counter stop (25) when subjected to the clamping force ($F_2$).

13. The clamping device according to claim 8, wherein the force-applying element is at least one pressure spring (47) generating the compressive force ($F_1$) and wherein the at least one pressure spring (47) is arranged on an axis (44) fastened in the counter stop (25), wherein a distance ($l_1$) between the axis (44) and a pivoting axis (24) of the transmission element (23) is greater than the distance ($l_2$) between the ram (28) and the pivoting axis (24).

14. A clamping device for an adjustable fence of a moulding machine, wherein the adjustable fence (12) comprises a first side configured to guide workpieces through the moulding machine and comprises a second side facing away from the first side, wherein at least one counter stop (25) is arranged at the second side of the adjustable fence (12); the clamping device comprising:

a transmission element arranged at the at least one counter stop (25) opposite the adjustable fence (12);

at least one clamping part (33) arranged at the transmission element;

wherein the at least one clamping part (33) is configured to clamp the adjustable fence against the at least one counter stop (25), when the transmission element is acted upon with a force ($F_1$) that is converted by the transmission element into a clamping force ($F_2$) acting upon the clamping part (33) to provide a clamping action fixedly clamping the adjustable fence against the at least one counter stop (25);

a release unit (51), comprising a cylinder (54) and a piston rod (52) movably disposed in the cylinder (54), wherein the piston rod (52) is connected to the at least one counter stop (25) and the cylinder (54) is connected to the transmission element, wherein the release unit (51) is configured to act on the transmission element to release the clamping action;

wherein the clamping part (33) is a sliding block that lies in a T-groove (31) in the adjustable fence (12) which T-groove extends in an adjusting direction (17) of the adjustable fence (12).

15. A clamping device for an adjustable fence of a moulding machine, wherein the adjustable fence (12) is configured to guide workpieces through the moulding machine and wherein at least one counter stop (25) is arranged at the adjustable fence (12); the clamping device comprising:
    a transmission element;
    at least one clamping part (33) arranged at the transmission element;
    wherein the at least one clamping part (33) is configured to clamp the adjustable fence against the at least one counter stop (25), when the transmission element is acted upon with a force ($F_1$) that is converted by the transmission element into a clamping force ($F_2$) acting upon the clamping part (33) to provide a clamping action;
    a release unit (51), comprising a cylinder (54) and a piston rod (52) movably disposed in the cylinder (54), wherein the piston rod (52) is connected to the at least one counter stop (25) and the cylinder (54) is connected to the transmission element (23), wherein the release unit (51) is configured to act on the transmission element to release the clamping action;
    wherein the transmission element (23) is a two-armed lever, one arm of which is acted upon with the force ($F_1$) that is a compressive force and the other arm of which generates the clamping force ($F_2$), wherein the other arm of the lever (23) and the counter stop (25) are penetrated by a ram (28), wherein the ram (28) comprises a first end that is provided with the clamping part (33);
    wherein the ram (28) comprises a second end facing away from the clamping part (33), wherein a counter bearing (34 to 36) is provided at the second end of the ram (28) and is supported on the outer side (45) of the transmission element (23) facing away from the counter stop (25);
    wherein the counter bearing comprises a conical socket (34) and a taper disc (35) cooperating therewith, wherein the conical socket (34) is supported on the outer side (45) of the transmission element (23) facing away from the counter stop (25).

16. A clamping device for an adjustable fence of a moulding machine, wherein the adjustable fence (12) comprises a first side facing workpieces and configured to laterally guide, in a fixed working position of the adjustable fence (12) on the moulding machine, the workpieces as the workpieces move along the adjustable fence (12) through the moulding machine in a transport direction, wherein the adjustable fence (12) further comprises a second side facing away from the workpieces, wherein at least one counter stop (25), comprising a first face and an opposite second face facing away from the first face, is arranged at the second side of the adjustable fence (12) so that the first face is facing the second side of the adjustable fence (12); the clamping device comprising:
    a transmission element arranged at the at least one counter stop (25) opposite the adjustable fence (12);
    at least one clamping part (33) arranged at the transmission element;
    wherein the at least one clamping part (33) is configured to clamp the adjustable fence against the at least one counter stop (25), when the transmission element is acted upon with a force ($F_1$) that is converted by the transmission element into a clamping force ($F_2$) acting upon the clamping part (33) to provide a clamping action fixedly clamping the adjustable fence against the at least one counter stop (25) in the fixed working position;
    wherein the transmission element (23) is a two-armed lever comprising a first arm and a second arm, wherein the first arm of the lever (23) and the counter stop (25) are penetrated by a ram (28), wherein the ram (28) comprises an end that is provided with the clamping part (33);
    a release unit (51), comprising a cylinder (54) and a piston rod (52) movably disposed in the cylinder (54), wherein the piston rod (52) is connected to the at least one counter stop (25) and the cylinder (54) is connected to the transmission element, wherein the release unit (51) actuates the transmission element in order to release the clamping action, wherein the release unit (51) engages an end of the second arm of the transmission element (23) facing away from the ram (28).

17. A moulding machine comprising:
    a clamping device;
    an adjustable fence (12) comprising a first side facing workpieces and configured to laterally guide, in a fixed working position of the adjustable fence (12) on the moulding machine, the workpieces as the workpieces move along the adjustable fence (12) through the moulding machine in a transport direction, and comprising a second side facing away from the first side:
    at least one counter stop (25) comprising a first face and an opposite second face facing away from the first face, wherein the at least one counter stop (25) is arranged at the second side of the adjustable fence (12) so that the first face is facing the second side of the adjustable fence (12);
    the clamping device comprising a transmission element arranged at the second face of the at least one counter stop (25) opposite the adjustable fence (12);
    at least one clamping part (33) arranged at the transmission element;
    wherein the transmission element (23) is acted upon by a force-applying element with a force ($F_1$) that is converted by the transmission element into a clamping force ($F_2$) acting upon the clamping part (33) so that the clamping part provides a clamping action fixedly clamping the adjustable fence against the at least one counter stop (25) in the fixed working position; and
    a release unit (51), comprising a cylinder (54) and a piston rod (52) movably disposed in the cylinder (54), wherein the piston rod (52) is connected to the at least one counter stop (25) and the cylinder (54) is connected to the transmission element, wherein the release unit (51), when actuated, moves the transmission element against the force ($F_1$) of the force-applying element (47) to release the clamping action.

18. The moulding machine according to claim 17, wherein the adjustable fence (12) is assigned to a right tool (6) of the moulding machine.

19. The moulding machine according to claim 18, wherein the adjustable fence (12) is arranged behind the right tool (6) in a transport direction (5) of the workpieces through the moulding machine.

* * * * *